Figure 4:
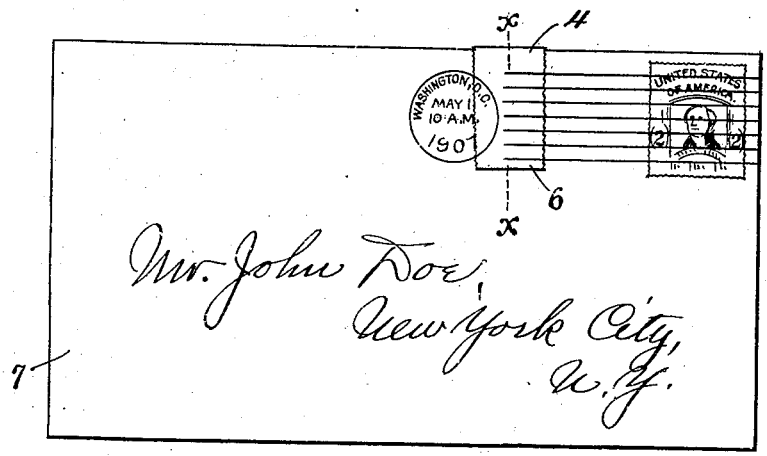

C. CATLETT & B. F. CHILDRESS.
FRACTIONAL INSURANCE POLICY.
APPLICATION FILED AUG. 15, 1907.
918,280.
Patented Apr. 13, 1909.
3 SHEETS—SHEET 1.
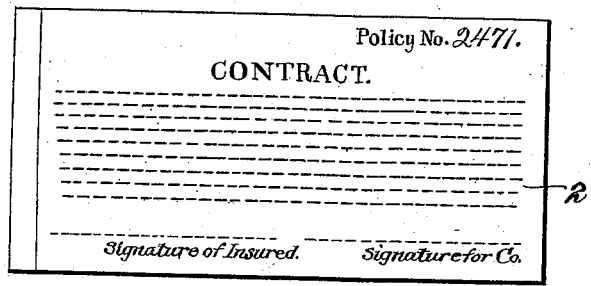
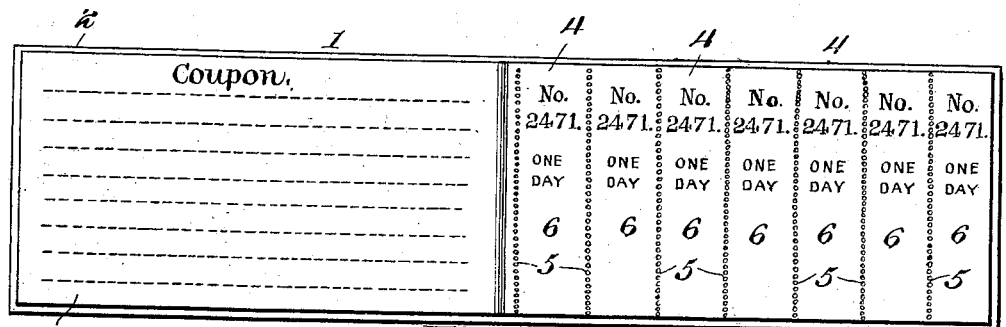
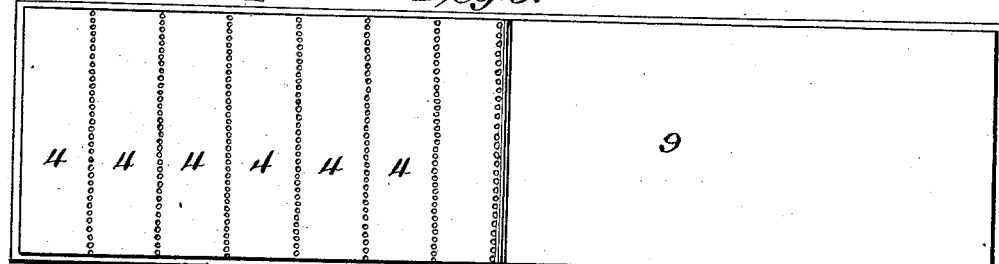

C. CATLETT & B. F. CHILDRESS.
FRACTIONAL INSURANCE POLICY.
APPLICATION FILED AUG. 15, 1907.

918,280.

Patented Apr. 13, 1909.
3 SHEETS—SHEET 2.

Charles Catlett
and Benjamin F. Childress, Inventors

Witnesses
Howard D. Orr,
H. F. Riley

By E. G. Siggers
Attorney

C. CATLETT & B. F. CHILDRESS.
FRACTIONAL INSURANCE POLICY.
APPLICATION FILED AUG. 15, 1907.

918,280.

Patented Apr. 13, 1909.

3 SHEETS—SHEET 3.

Fig. 7.

FRACTIONAL INSURANCE      Policy No. 2471.
CONTRACT.

The Company hereby insures _____
Attached hereto as a part of this contract are detachable coupons bearing the same number as this contract each entitling the insured to one day's insurance according to the above provision. The amount stipulated in the schedule of losses hereof for loss of life is payable to the person to whom is addressed in the handwriting of the insured a postal, letter or other first class mail matter and to which is attached one or more of these coupons _____
_____ provided the coupon is touched by the cancellation stamp of the Post Office, or is so attached as to carry a portion of the necessary address of the mail matter. The insurance hereunder shall commence at 12 o'clock midnight standard time at the place where and on the day when said mail matter is post-marked and the coupon attached and cancelled as provided, and shall continue for the time set forth in the coupon so attached and cancelled.

Signature of insured.      Signature for Co.

Witnesses
Howard D. Orr.
J. J. Riley

Charles Catlett
Benjamin F. Childress, Inventors,
By C. G. Siggers
Attorney

THE NORRIS PETERS CO., WASHINGTON, D. C.

UNITED STATES PATENT OFFICE.

CHARLES CATLETT, OF STAUNTON, AND BENJAMIN F. CHILDRESS, OF LYNCHBURG, VIRGINIA.

FRACTIONAL-INSURANCE POLICY.

No. 918,280.     Specification of Letters Patent.     Patented April 13, 1909.

Application filed August 15, 1907. Serial No. 388,716.

*To all whom it may concern:*

Be it known that we, CHARLES CATLETT and BENJAMIN F. CHILDRESS, citizens of the United States, residing at Staunton and Lynchburg, respectively, in the counties of Augusta and Campbell, respectively, and State of Virginia, have invented a new and useful Fractional-Insurance Policy, of which the following is a specification.

The invention relates to a fractional insurance policy.

The object of the present invention is to provide a simple, inexpensive and efficient insurance policy, adapted to permit accident or other insurances to be readily sold for various periods of time, and capable of enabling a purchaser to use fractions of such insurance either successively to provide continued insurance covering such period, or at intervals until the amount of insurance has been consumed.

A further object of the invention is to provide means for enabling such fractional insurance to be transmitted to the beneficiary and to be canceled as it is used.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 5:
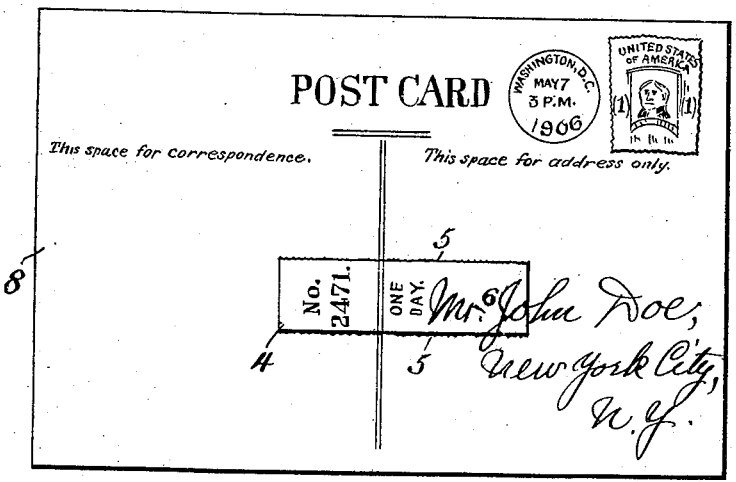
Figure 6:
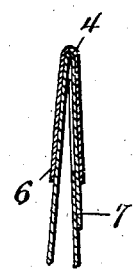

In the drawings:—Figure 1 is a plan view of a fractional insurance book, constructed in accordance with this invention and illustrating the arrangement of the contract between the company and the purchaser. Fig. 2 is a similar view, the book being open and showing the return coupon retained by the seller of the insurance and the fractional insurance coupon. Fig. 3 is a similar view, showing the fractional insurance coupon and one of the paraffin leaves for separating the sheets of the coupon. Fig. 4 is a plan view of a letter, illustrating the manner of canceling the fractional insurance coupons. Fig. 5 is a similar view of a souvenir postal card, showing another means of canceling the fractional insurance coupon. Fig. 6 is a detail sectional view, taken substantially on the line x—x of Fig. 4. Fig. 7 is an enlarged plan view of a fractional insurance book, showing portions of the insurance contract.

Like numerals of reference designate corresponding parts in all the figures of the drawings.

The fractional insurance policy is preferably in the form of a book 1, but it may be prepared in any other preferred form. One of the covers 2 of the book has printed on it in detail the contract between the insurance company and the purchaser of the insurance together with spaces for the signature of the company and the signature of the insured. The cover also contains the words "Policy No." and figures designating the number of the policy, or other suitable means of identification. The contract is designed to contain all the necessary provisions for governing the use of the fractional insurance, hereinafter described, such as the time limit, say twelve months, in which such fractional insurance must be used, the means for canceling such fractional insurance as it is used, the means for designating when such fractional insurance shall commence to run, and all other legitimate and necessary provisions to adapt the fractional insurance policy to the character of insurance offered for sale. As it may not be convenient or desirable to print the whole of the contract of insurance on the exterior of one or both of the covers of the back of the book, a portion of it may be printed on the inner faces of the cover, or the contract of insurance may be printed on a foldable extension of the back, or any other suitable means may be provided for connecting the contract of insurance with the back of the book. The book is also provided with a detachable return coupon 3, which is in the form of a leaf and designed to contain a memorandum of the sale of the book and such other data as may be required by the insurance company. The return coupon 3, which is retained by the salesman, is to be filled out at the time of the purchase of the book of fractional insurance and to be sent to the company to notify them of such transaction.

The fractional insurance books, which are designed particularly for accident insurances, may be issued to cover any period of time, and it is provided with a plurality of detachable gummed coupons 4, consisting of narrow strips of thin paper and separated by rows of perforations 5. Each detachable fractional insurance coupon 4 is designed to represent one day of insurance, and it contains the policy number of the cover of the book bearing the contract, and any other means for identifying the detachable fractional insurance coupon with the contract of the cover of the book. The contract of the cover is indefinite as to the term or period of insurance, which is limited or defined by the number of attached coupons. Each fractional insurance coupon is also provided at one end with a blank cancellation portion 6, and when the purchaser of the book of insurance desires to use one of the fractional insurance coupons 4, he detaches the same and sticks the detached coupon on a letter 7, or other piece of mail matter addressed to the beneficiary in accordance with the instructions or requirements of his contract of insurance, and then deposits such letter, postal, or other mail matter in a post office, letter box, or other receptacle provided by the Government for the reception of mail matter. The fractional insurance coupon 4 may be conveniently applied to a letter 7, as illustrated in Figs. 4 and 6 of the accompanying drawings, wherein it is shown folded over the upper edge of the letter, the blank cancellation portion 6 being arranged on the front of the letter, and the other portion on the back of the same. The front cancellation portion 6 is designed to be placed, as shown in Fig. 4, so as to receive a portion of and be canceled by the post mark, indicating the date of the receipt of the letter in the post office. The contract is designed to contain a suitable provision for the insurance to commence or run from some specified time on the day when the post mark shows that the letter, postal, or other mail matter was sent or mailed, and to continue for the period covered by the coupon or coupons, as one or more coupons may be applied to a letter or postal.

In Fig. 5 of the drawings is illustrated another mode of cancellation, the fractional insurance coupon 4 being applied to a souvenir postal 8 in position for the blank cancellation portion to be canceled by a portion of the address of the postal, but it may be agreed that the insurance coupon shall be canceled by the signature of the insured on such postal, or a portion of the message, or the fractional insurance coupon may be canceled by any other means provided for in the contract of insurance.

Books are designed to be issued for sale at news-stands, ticket offices, and other convenient places for the disposal of fractional insurance covering the period of a week, ten days, two weeks, or any other period of time, and one or more sheets 9 of paraffin will be provided for separating the adhesive material on the backs of the detachable fractional insurance coupon from the adjacent portions of the book to prevent such coupon from adhering to other portions of the book.

Having thus fully described our invention, what we claim as new and desire to secure by Letters Patent, is:—

1. A fractional insurance policy consisting of a body portion containing an insurance contract indefinite in its terms as to the period of insurance, and a plurality of coupons separable from the body of the policy and identified by characters with the same, said contract limiting the period of insurance by reference to the coupons, each coupon covering a definite period of insurance, and said coupons being constructed of a size to be applied exteriorly to mail matter in position to be canceled by the post mark.

2. A fractional insurance policy consisting of a body portion containing an insurance contract indefinite in its terms as to the period of insurance, and a plurality of coupons separable from the body of the policy and identified by characters with the same, said contract limiting the period of insurance by reference to the coupons, each coupon covering a definite period of insurance, and said coupons being gummed to enable them to be applied exteriorly to mail matter addressed to the beneficiary.

3. A fractional insurance policy consisting of a body portion containing an insurance contract indefinite in its terms as to the period of insurance, and a plurality of coupons separable from the body of the policy and identified by characters with the same, said contract limiting the period of insurance by reference to the coupons, each coupon covering a definite period of insurance, and said coupons being gummed to enable them to be applied exteriorly to mail matter addressed to the beneficiary and having a blank cancellation portion.

4. A fractional insurance policy consisting of a body portion containing an insurance contract indefinite in its terms as to the period of insurance, and a plurality of coupons separable from the body of the policy and identified by characters with the same, said contract limiting the period of insurance by reference to the coupons, each coupon covering a definite period of insurance, and said coupons being gummed to enable them to be applied exteriorly to mail matter addressed to the beneficiary and having a blank cancellation portion located at one end of the coupon and adapted to be arranged to be canceled by the post mark of a piece of mail matter.

5. A fractional insurance policy consisting of a book provided on its cover with a contract of insurance indefinite in its terms as to the period of insurance, and a plurality of detachable coupons arranged in the form of one or more leaves, said contract limiting the period of insurance by reference to the coupons, each coupon covering a definite period of time, and the said coupons being constructed of a size to be applied exteriorly to mail matter in position to be canceled by the post mark.

6. A fractional insurance policy consisting of a book provided on its cover with a contract of insurance indefinite in its terms as to the period of insurance, and a plurality of detachable coupons arranged in the form of one or more leaves, said contract limiting the period of insurance by reference to the coupons, each coupon covering a definite period of time, and the said coupons being provided with means for attaching them to the exterior of mail matter and having cancellation portions.

7. A fractional insurance policy consisting of a book provided on its cover with a contract of insurance indefinite in its terms as to the period of insurance, and a plurality of detachable coupons arranged in the form of one or more leaves, said contract limiting the period of insurance by reference to the coupons, each coupon covering a definite period of time, and the said coupons being provided with means for attaching them to the exterior of mail matter and having cancellation portions, and a coupon arranged in the form of a leaf and separable from the book so as to be retained by the insurance company issuing the same.

8. A fractional insurance policy consisting of a body portion containing an insurance contract indefinite in its terms as to the period of insurance, and a plurality of coupons separable from the body portion and identified by characters with the same, said contract limiting the period of insurance by reference to the coupons, each coupon covering a definite period of time, and the said coupons being provided with means for enabling them to be attached to the exterior of mail matter addressed to the beneficiary for designating the time from which the insurance is to run and for canceling the coupon.

9. A fractional insurance policy consisting of a book containing a contract of insurance indefinite in its terms as to the period of insurance, and a plurality of detachable coupons arranged in the form of one or more leaves and identified by characters with the said contract and constructed of a size to be applied exteriorly to mail matter addressed to the beneficiary for designating the time from which the insurance is to run and for canceling the coupons, each coupon covering a definite period of time and the contract limiting the period of insurance by reference to the coupons.

10. A fractional insurance policy consisting of a body portion containing an insurance contract, and a plurality of coupons identified by characters with the body portion of the policy and separated by weakened lines from said body portion and from each other, said contract limiting the period of insurance by reference to the coupons, each coupon covering a definite period of insurance and said coupons being constructed of a size to be applied exteriorly to mail matter.

In testimony, that we claim the foregoing as our own, we have hereto affixed our signatures in the presence of two witnesses.

CHARLES CATLETT.
BENJAMIN F. CHILDRESS.

Witnesses for Catlett:
   GORDON ARMSTRONG,
   HAMPTON H. WAYT.

Witnesses for Childress:
   C. B. YOUNG,
   JNO. C. HAMNER.